(12) United States Patent
Kinney et al.

(10) Patent No.: US 7,249,091 B2
(45) Date of Patent: Jul. 24, 2007

(54) METHOD AND SYSTEM FOR CREDIT AUTHORIZATION IN A MEMBER EXCHANGE

(75) Inventors: Catherine R. Kinney, New York, NY (US); Ann E. Fitzgibbons, New York, NY (US); Louis Pizzo, Larchmont, NY (US); Mario Rogowicz, Baldwin, NY (US); Warren S. Rosenbaum, Oceanside, NY (US); Avner Gelb, Brooklyn, NY (US); Katherine M. Lajoie-Malik, Rosemont, NY (US); Steven H. Hughes, Basking Ridge, NJ (US)

(73) Assignee: New York Stock Exchange, Inc., New York, NY (US)

( * ) Notice: Subject to any disclaimer, the term of this patent is extended or adjusted under 35 U.S.C. 154(b) by 1258 days.

(21) Appl. No.: 09/901,553

(22) Filed: Jul. 6, 2001

(65) Prior Publication Data

US 2002/0046152 A1 Apr. 18, 2002

Related U.S. Application Data

(60) Provisional application No. 60/219,272, filed on Jul. 19, 2000.

(51) Int. Cl.
*G06Q 40/00* (2006.01)
(52) U.S. Cl. ...................................................... 705/38
(58) Field of Classification Search .................. 705/38
See application file for complete search history.

(56) References Cited

U.S. PATENT DOCUMENTS 5,375,055 A 12/1994 Togher et al.
5,649,116 A 7/1997 McCoy et al.
5,671,363 A 9/1997 Cristofich et al.
5,717,860 A * 2/1998 Graber et al. ............... 709/227
5,717,989 A 2/1998 Tozzoli et al.

(Continued)

OTHER PUBLICATIONS

Frederick, Jim. A Trading Strategy for Beating the Spread. Money. New York, Jun. 1998. vol. 27, Iss. 6. (3 pages).*
Hume, L.S. Disclosure, Pay-to-Play, Litigation Reform: Washington Hasn't Lost Interest in Bonds. Bond Buyer. New York, Feb. 6, 1995. vol. 311, Iss. 29581. (5 pages).*

(Continued)

*Primary Examiner*—Richard E. Chilcot, Jr.
*Assistant Examiner*—Jennifer L. Liversedge
(74) *Attorney, Agent, or Firm*—Milbank, Tweed, Hadley & McCloy LLP

(57) ABSTRACT

An exchange member establishes a threshold credit value for transactions by a non-member institution. The threshold value is provided to a credit authorization service of the exchange, which acts as a surrogate for the exchange members. Securities transaction or orders from non-member institutions are then transmitted from the non-member institution to the credit authorization service of the exchange. The credit authorization service compares the transaction with a percentage of the pre-established threshold value. If the transaction does not exceed the percentage of the pre-established threshold, the system forwards the transaction to the exchange. If the transaction does exceed the percentage of the pre-established threshold, the system notifies the sponsoring exchange member and possibly the non-member institution. The percentage of the pre-established threshold may be less than or equal to 100 percent of the pre-established value. The exchange member has various opportunities to change the threshold value. The identity of the non-member institution and the identity of the exchange member may be removed or masked on the transaction.

42 Claims, 16 Drawing Sheets

U.S. PATENT DOCUMENTS

| | | |
|---|---|---|
| 5,732,400 A | 3/1998 | Mandler et al. |
| 5,802,499 A | 9/1998 | Sampson et al. |
| 5,950,176 A | 9/1999 | Keiser et al. |
| 6,014,627 A * | 1/2000 | Togher et al. .................. 705/1 |
| 6,018,721 A | 1/2000 | Aziz et al. |
| 6,029,146 A | 2/2000 | Hawkins et al. |
| 6,058,378 A | 5/2000 | Clark et al. |
| 2002/0032635 A1* | 3/2002 | Harris et al. .................. 705/37 |

OTHER PUBLICATIONS

Boom.com Reveals U.S. Trading & New Look Website—www.internetnews.com, pp. 1-2.

North American Institutional Brokers-Professional Order Execution Website—www.naib.com: "About Us", pp. 1-2; "Total Trading Support", pp. 1-2.

Market Access Subcommittee Interim Report, Nov. 27, 2001.

Best Practices for Organized Electronic Markets, Apr. 24, 2002.

* cited by examiner

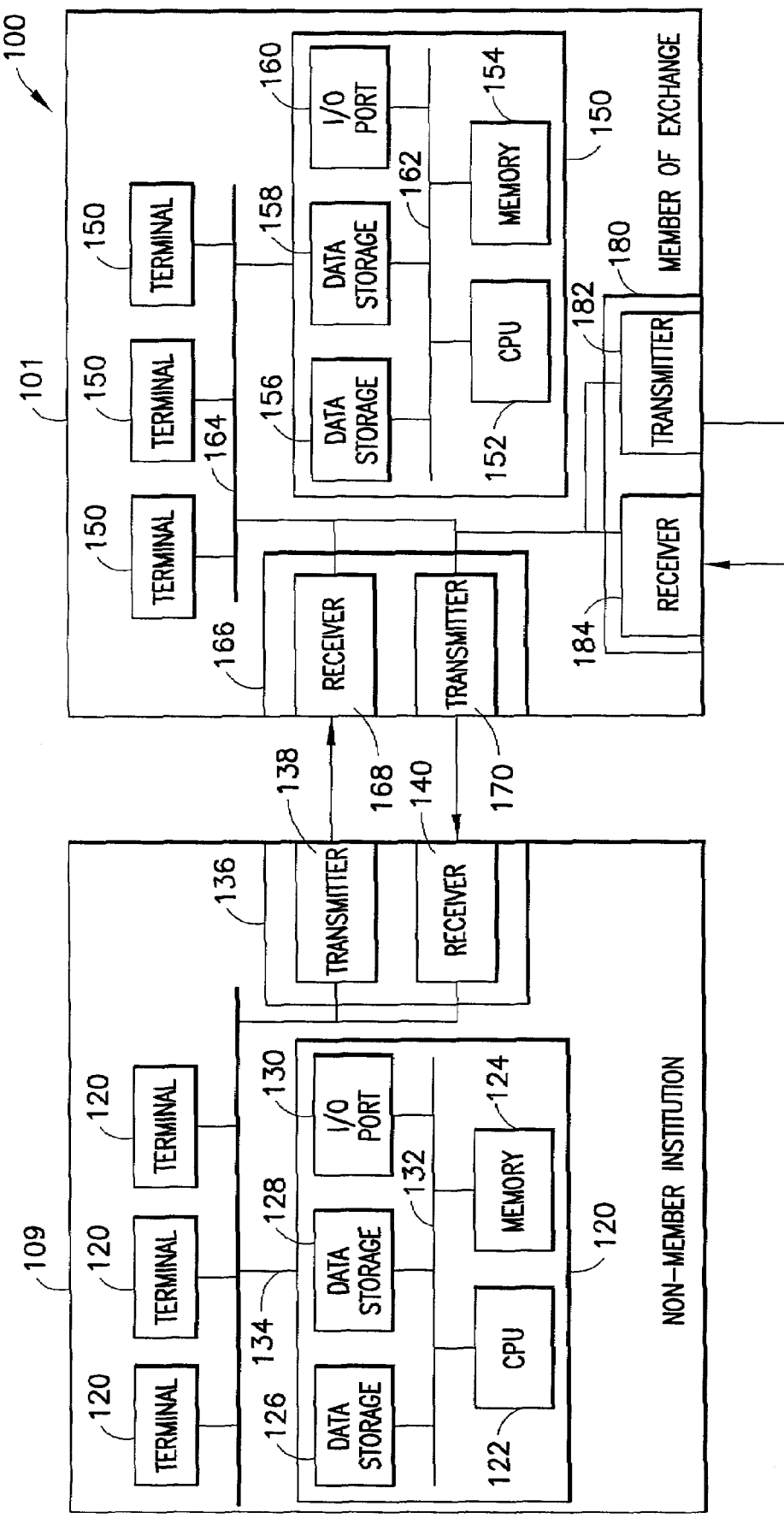

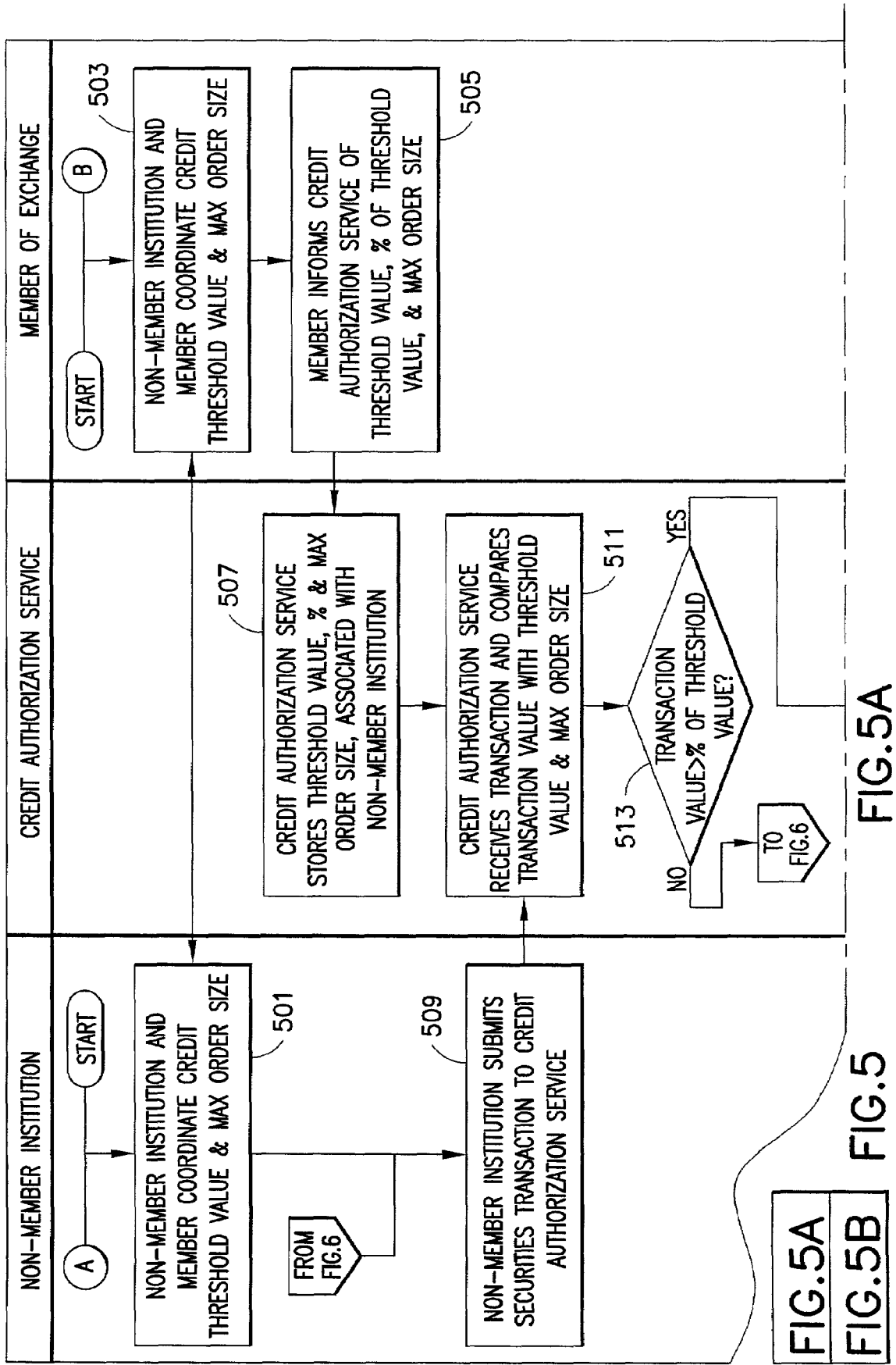

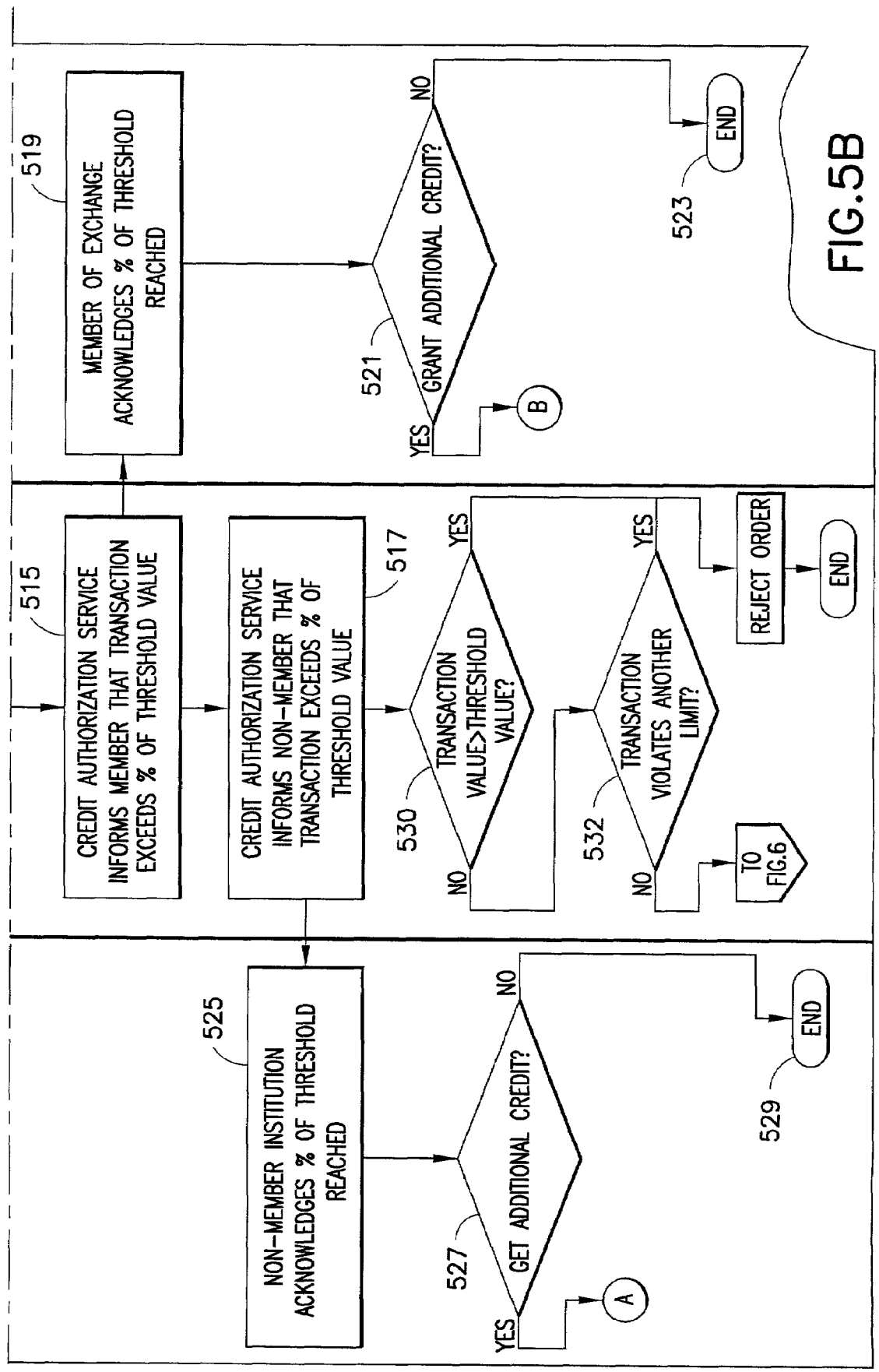

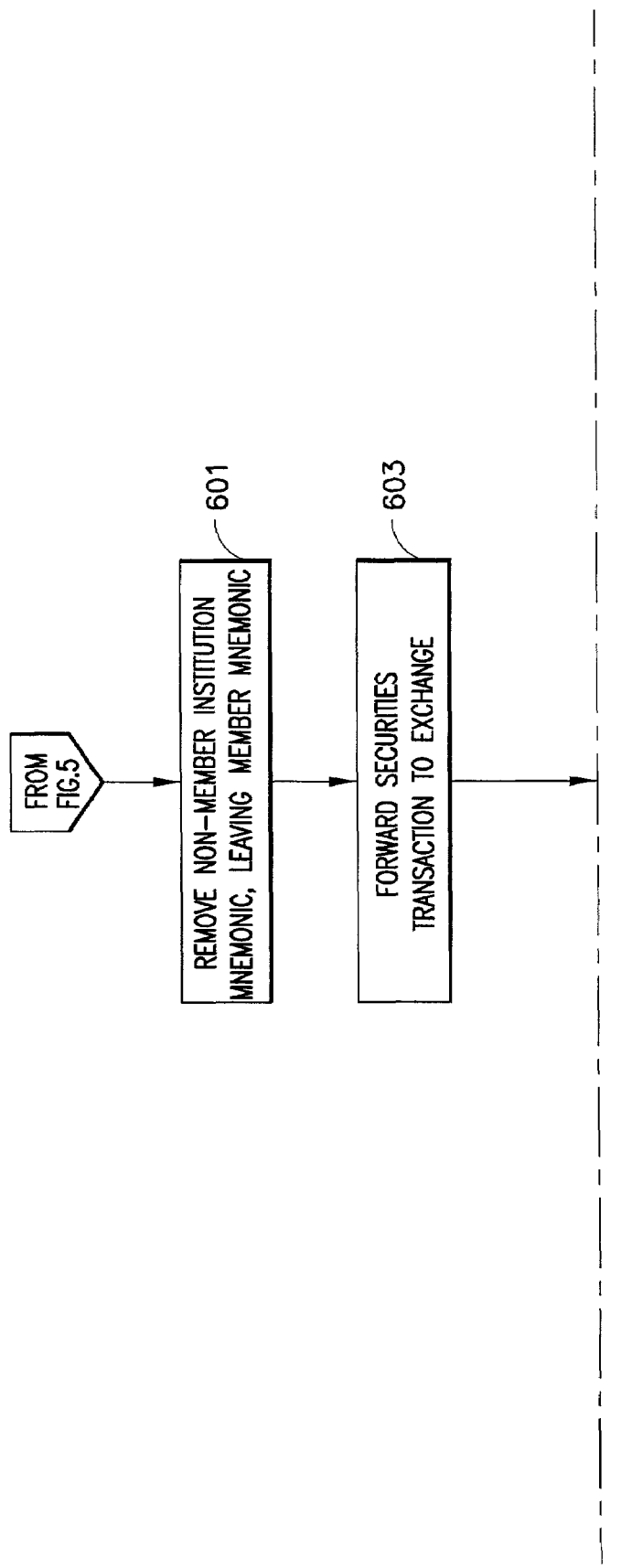

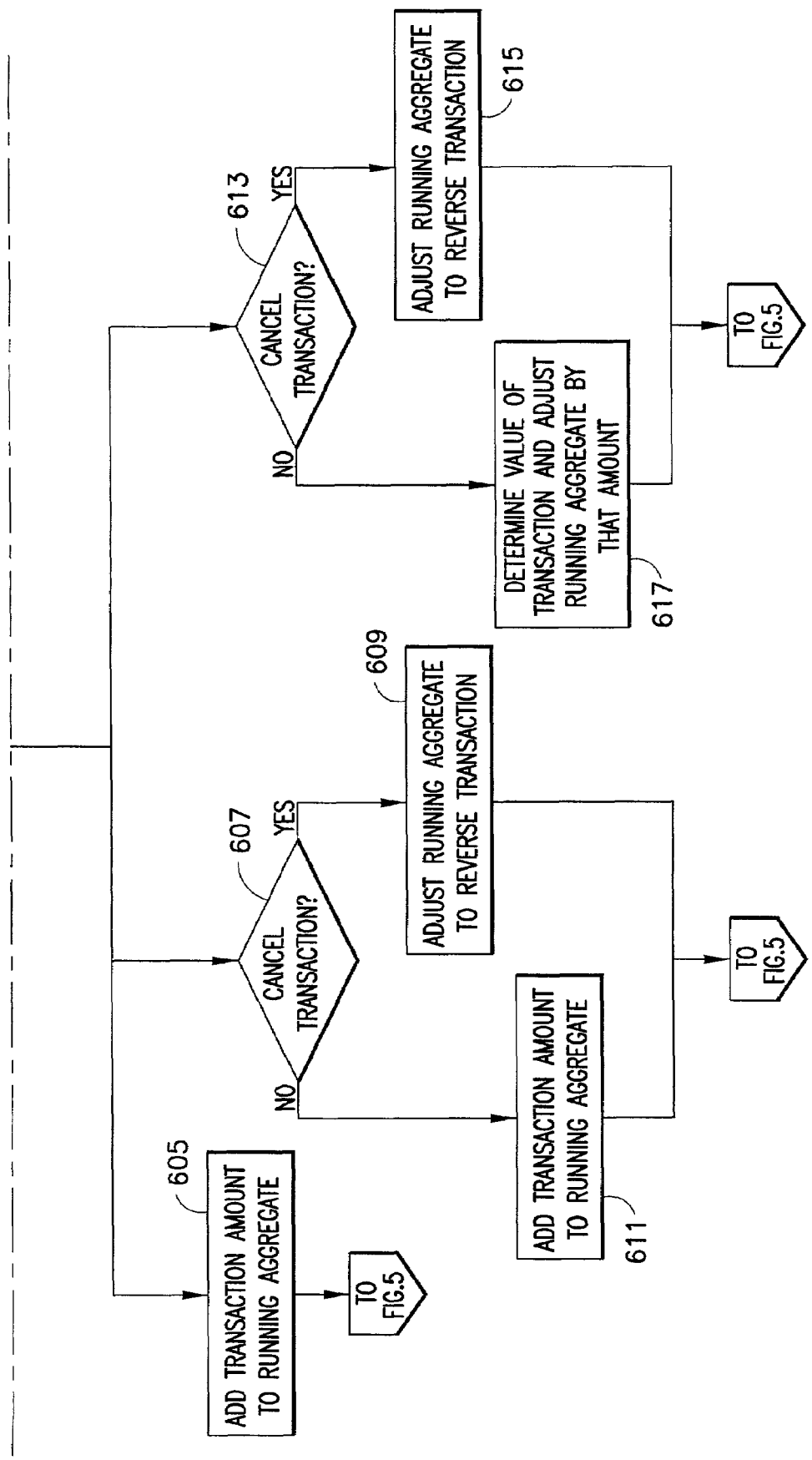

| NON-MEMBER INSTITUTION 701 | NON-MEMBER MNEMONIC 703 | SPONSORING EXCHANGE MEMBER 705 | EXCHANGE MEMBER MNEMONIC 707 | THRESHOLD VALUE 709 | % ALERT 711 | MAX ORDER SIZE 713 |
|---|---|---|---|---|---|---|
| instA | INA | member1 | MEM1 | 1000 | 75% | 250 |
| instB | INB | member1 | MEM1 | 300 | 80% | 400 |
| instC | INC | member1 | MEM1 | 1500 | 100% | 300 |
| privA | PRIVA | member1 | MEM1 | 5000 | 95% | 100 |
| instA | INA | member2 | MEM2 | 4300 | 100% | 2000 |
| instD | IND | member2 | MEM2 | 5800 | 100% | 9999 |
| privB | PRIVB | member2 | MEM2 | 1000 | 50% | 60 |
| instE | INE | member3 | MEM3 | 1000 | 65% | 200 |

FIG. 7

| LIMIT ORDER RECONCILED ACCORDING TO ABSOLUTE VALUE OF TRANSACTION PRICE | | | |
|---|---|---|---|
| TRADING DAY | 206 | | |
| NON-MEMBER INSTITUTION | instB | | |
| NON-MEMBER MNEMONIC | INB | | |
| SPONSORING EXCHANGE MEMBER | member1 | | |
| EXCHANGE MEMBER MNEMONIC | MEM1 | | |
| THRESHOLD VALUE | 300 | | |
| PERCENTAGE ALERT | 80.00% | | |
| ALERT VALUE | 240 | | |
| | | | |
| BEGINNING AGGREGATE | 185 | | |
| | | | |
| TRANSACTION(s) | ACTUAL | APPLIED | |
| | | | |
| BUY | 20 | 20 | 205 |
| SELL | −10 | 10 | 215 |
| BUY | 5 | 5 | 220 |
| BUY | 6 | 6 | 226 |
| BUY | 6 | 6 | 232 |
| SELL | −5 | 5 | 237 |
| SELL | −4 | 4 | 241 |
| CANCEL SELL | 4 | 4 | 245 |
| BUY | 3 | 3 | 248 |
| SELL | −2 | 2 | 250 |
| SELL | −1 | 1 | 251 |
| SELL | −10 | 10 | 261 |
| BUY | 2 | 2 | 263 |
| BUY | 1 | 1 | 264 |
| | | | |
| NETTED TOTAL | 15 | | |
| APPLIED TOTAL | | 79 | |

FIG.8

| LIMIT ORDER RECONCILED ACCORDING TO ABSOLUTE VALUE OF LIMIT PRICE, WITH CANCEL REVERSE | | | |
|---|---|---|---|
| TRADING DAY | 206 | | |
| NON-MEMBER INSTITUTION | instB | | |
| NON-MEMBER MNEMONIC | INB | | |
| SPONSORING EXCHANGE MEMBER | member1 | | |
| EXCHANGE MEMBER MNEMONIC | MEM1 | | |
| THRESHOLD VALUE | 300 | | |
| PERCENTAGE ALERT | 80.00% | | |
| ALERT VALUE | 240 | | |
| | | | |
| BEGINNING AGGREGATE | 185 | | |
| | | | |
| TRANSACTION(s) | ACTUAL | APPLIED | |
| | | | |
| BUY | 20 | 20 | 205 |
| SELL | −10 | 10 | 215 |
| BUY | 5 | 5 | 220 |
| BUY | 6 | 6 | 226 |
| BUY | 6 | 6 | 232 |
| SELL | −5 | 5 | 237 |
| SELL | −4 | 4 | 241 |
| CANCEL SELL | 4 | −4 | 237 |
| BUY | 3 | 3 | 240 |
| SELL | −2 | 2 | 242 |
| SELL | −1 | 1 | 243 |
| SELL | −10 | 10 | 253 |
| BUY | 2 | 2 | 255 |
| BUY | 1 | 1 | 256 |
| | | | |
| NETTED TOTAL | 15 | | |
| APPLIED TOTAL | | 71 | |

902 → CANCEL SELL row

FIG.9

| MARKET ORDERS RECONCILED ACCORDING TO EXECUTION PRICE | | | |
|---|---|---|---|
| TRADING DAY | 206 | | |
| NON-MEMBER INSTITUTION | instB | | |
| NON-MEMBER MNEMONIC | INB | | |
| SPONSORING EXCHANGE MEMBER | member1 | | |
| EXCHANGE MEMBER MNEMONIC | MEM1 | | |
| THRESHOLD VALUE | 300 | | |
| PERCENTAGE ALERT | 80.00% | | |
| ALERT VALUE | 240 | | |
| | | | |
| BEGINNING AGGREGATE | 185 | | |
| | | | |
| TRANSACTION(s) | ACTUAL | APPLIED | |
| | | | |
| BUY | 20 | 20 | 205 |
| SELL | −10 | −10 | 195 |
| BUY | 5 | 5 | 200 |
| BUY | 6 | 6 | 206 |
| BUY | 6 | 6 | 212 |
| SELL | −5 | −5 | 207 |
| SELL | −4 | −4 | 203 |
| CANCEL SELL | 4 | 4 | 207 |
| BUY | 3 | 3 | 210 |
| SELL | −2 | −2 | 208 |
| SELL | −1 | −1 | 207 |
| SELL | −10 | −10 | 197 |
| BUY | 2 | 2 | 199 |
| BUY | 1 | 1 | 200 |
| | | | |
| NETTED TOTAL | 15 | | |
| APPLIED TOTAL | | 15 | |

| T+3 RECONCILE | | BEGINNING + DAILY APPLIED | RECONCILE T−3 | AGGREGATE BEGINNING ON NEXT DAY |
|---|---|---|---|---|
| TRADING DAY | DAILY APPLIED | | | |
| ... | | | | 0 |
| 200 | 100 | 100 | 0 | 100 |
| 201 | 60 | 160 | 0 | 160 |
| 202 | 80 | 240 | −100 | 140 |
| 203 | 50 | 190 | −60 | 130 |
| 204 | 90 | 220 | −80 | 140 |
| 205 | 95 | 235 | −50 | 185 |
| 206 | 79 | 264 | −90 | 174 |
| 207 | | | | |

| T+1 RECONCILE | | | | |
|---|---|---|---|---|
| TRADING DAY | DAILY APPLIED | BEGINNING + DAILY APPLIED | RECONCILE T-1 | AGGREGATE BEGINNING ON NEXT DAY |
| ... | | | | 0 |
| 200 | 100 | 100 | -100 | 0 |
| 201 | 60 | 60 | -60 | 0 |
| 202 | 80 | 80 | -80 | 0 |
| 203 | 50 | 50 | -50 | 0 |
| 204 | 90 | 90 | -90 | 0 |
| 205 | 95 | 95 | -95 | 0 |
| 206 | 79 | 79 | -79 | 0 |
| 207 | | | | |

FIG.12

METHOD AND SYSTEM FOR CREDIT AUTHORIZATION IN A MEMBER EXCHANGE

This application claims priority to U.S. Provisional Patent Application Ser. No. 60/219,272, filed Jul. 19, 2000, and entitled: SYSTEM AND METHOD FOR CREDIT AUTHORIZATION IN A SECURITIES TRANSACTION.

BACKGROUND

1. Field of the Invention

The invention relates to the field of financial transactions and more particularly to the field of non-member institution securities transactions on a member securities exchange.

2. Description of the Related Art

In member exchange systems, securities transactions or orders are processed through exchange members before being exposed to the exchange floor for trading. Under the existing regulations and exchange rules, there is no opportunity for a non-member institution to directly submit a transaction to the exchange without submitting the transaction to a member first. Electronic order submission by the non-member institution may reduce order turn-around time, however, even where non-member institutions can electronically submit orders to the exchange through members, the non-member institution identity is typically included with the order, and therefore known or available on the floor. Non-member institutions want their identity to remain anonymous or hidden for at least as long as the order is being filled. Additionally, most non-member institutions executing transactions on the exchange would also like to stream-line the order submission process and reduce order turnaround time, wherever possible.

Accordingly, there is a need to maintain the anonymity of the institution or party placing the order, without violating the exchange regulations or rules, and reduce transaction execution times.

SUMMARY OF THE INVENTION

In one embodiment, the invention provides a system and method for processing a non-member transaction on a member securities exchange. The method includes transmitting a securities transaction from the non-member institution to a credit authorization service of the exchange, where the credit authorization service includes a value of the transaction in a running aggregate, compares the running aggregate with a pre-established threshold value which is at least partially established by a member of the exchange. The method also provides for processing the securities transaction if the running aggregate is below the pre-established threshold. Alternatively, the method provides for rejecting the securities transaction if the running aggregate is equal to or above the pre-established threshold. A message is received at the non-member institution with an indication as to whether the transaction was processed or was rejected. The threshold may be an aggregate value of transactions, or a transaction order size.

In one embodiment, the invention provides a system and method for processing a non-member transaction on a member securities exchange. This includes receiving at a credit authorization service a transaction from the non-member institution. A value of the transaction is compared with a pre-established threshold value, which is at least partially established by a member of the exchange. The transaction is processed if the value is below the pre-established threshold, and rejected if equal to or above the pre-established threshold.

In one embodiment, the invention provides a system and method for authorizing securities transactions submitted by a non-member institution to a member exchange. The method includes at least partially establishing a threshold value for securities transactions submitted by the non-member institution and informing the credit authorization service of the threshold value.

In one embodiment, the invention provides a method and system for processing a securities transaction on a member exchange. This includes transmitting a securities transaction from a non-member institution to a credit authorization service of the member exchange. The transaction includes a mnemonic for an exchange member and an identity of the non-member institution. The credit authorization service removes or masks the identity of the non-member institution from the transaction before exposing the transaction to the member exchange.

These aspects of the invention advantageously provide anonymity of the non-member institution or party placing the order while helping to reduce transaction execution times.

The foregoing specific aspects and advantages of the invention are illustrative of those which can be achieved by the present invention and are not intended to be exhaustive or limiting of the possible advantages that can be realized. Thus, the aspects and advantages of this invention will be apparent from the description herein or can be learned from practicing the invention, both as embodied herein or as modified in view of any variations which may be apparent to those skilled in the art. Accordingly the present invention resides in the novel parts, constructions, arrangements, combinations and improvements herein shown and described.

BRIEF DESCRIPTION OF THE DRAWINGS

The foregoing features and other aspects of the invention are explained in the following description taken in conjunction with the accompanying figures wherein:

FIG. 5 illustrates an embodiment of a method according to the instant invention;

FIG. 6 illustrates an embodiment of a method according to the instant invention;

FIG. 7 illustrates an embodiment of a database structure according to the instant invention;

FIG. 8 illustrates an embodiment of a reconciliation method according to the instant invention;

FIG. 9 illustrates an embodiment of a reconciliation method according to the instant invention;

FIG. 10 illustrates an embodiment of a reconciliation method according to the instant invention;

FIG. 11 illustrates an embodiment of a reconciliation method according to the instant invention; and FIG. 12 illustrates an embodiment of a reconciliation method according to the instant invention.

It is understood that the drawings are for illustration only and are not limiting.

DETAILED DESCRIPTION OF THE DRAWINGS

The system and method of the invention are appropriate for use in a securities exchange setting. At present, Securities and Exchange Commission regulations and individual Securities Exchange rules prohibit direct trading on member exchanges by non-members. The New York Stock Exchange, Inc. (NYSE) is one such member exchange.

There are certain "institutional" clients, who generate a large trading volume, but who are not exchange members. Some of these institutional clients may be affiliated with or corporate subsidiaries of exchange members, but are unable to trade in their own name as members of the exchange. In the interest of greater transaction execution speed, the exchanges and these non-member institutional clients would like to stream-line the order submission process, without violating the regulations and rules. It is also possible that exchange members will want to take advantage of aspects of the invention, for example when trading on their own accounts.

Accordingly, to allow non-member institutions greater flexibility, there must be some way to assure the credit guarantees provided by a member of an exchange, without requiring processing of every transaction by individual exchange members. This objective must be accomplished while maintaining the responsibilities of the exchange members with respect to their sponsored trades on the exchange.

It should be noted that throughout this patent, the term non-member institution is used. However, this does not necessarily mean that the non-member is necessarily an institution, or that the institution is a non-member. In fact, it is possible that the non-member institution is an individual investor, who is not an exchange member, or it is possible that the institution is actually an exchange member, who wants their trades to be handled as though they are from a non-member institution. Regardless of what the "institution" actual status is, for the purposes of the invention, the institution is treated as though they do not have member exchange trading privileges, and therefore require the credit authorization of a member.

A System According to the Invention

Figure 1B:
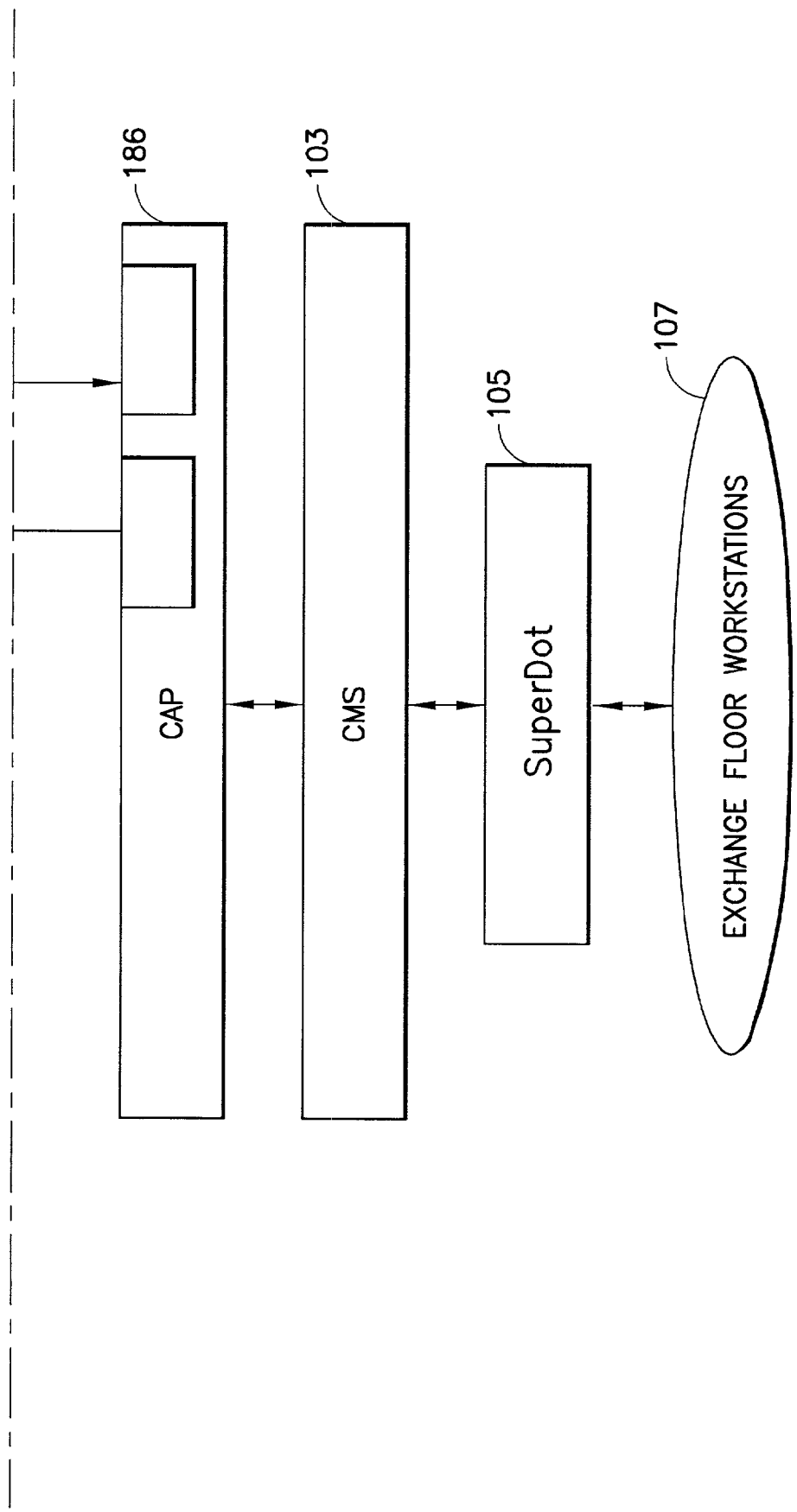
FIG. 1 illustrates a member exchange system at a high-level of abstraction.

FIG. 1 illustrates an example of a member exchange and one possible electronic inter-relationship among exchange members, non-member institutions and the exchange itself. The interrelationship illustrated in FIG. 1 is known and is provided to help distinguish the present invention. In system 100, orders or securities transactions from members of the exchange 101 are transmitted through the Common Access Point (CAP) 186 and Common Message Switch (CMS) 103 to the Designated Order Turnaround System 105, which is known on the NYSE as SuperDot, and are thereby routed to the proper trading floor point of sale devices 107.

In system 100, a non-member institutional client 109, who wishes to send an order or securities transaction to the exchange trading floor 107 for execution must first send their order to an exchange member 101, who in turn submits the order to the floor of the exchange 107 using Common Access Point 186, Common Message Switch 103 and Super-Dot 105. Although not illustrated in FIG. 1, the exchange and members of the exchange have developed a number of procedures with supporting systems to enhance security, rapid processing of orders, audit trails and accountability.

To accomplish the above-described securities transaction, an operator using a computer terminal 120 of non-member institution 109 enters details of the desired transaction. These details include the name of the particular security, whether the transaction is a sell or buy order, and whether there are any limits on the order or transaction (e.g., limit order price). Terminal 120 attaches the identity or mnemonic of the non-member institution to the order or transaction so that exchange member 101 will know the origin of the order or transaction. Once the order or transaction is ready, the institution operator forwards the order or transaction to exchange member 101, where the order or transaction is processed and forwarded to Common Access Point 186 and Common Message Switch 103 for eventual handling on the exchange. Typically, without the instant invention, the identity or mnemonic of the non-member institution (109) remains on the order, along with the identity or mnemonic of the exchange member (101). In this way, the exchange member (101) standing behind, or presenting the order to the exchange is known to the exchange and other members, and normally the identity of the non-member institution (109) placing the order is also known, or available to the exchange or other members.

After the order or transaction is executed on the exchange, an execution report is sent back to the non-member institution 109, with a copy of the execution report also provided to the exchange member clearing the order. This execution report is sent via SuperDot 105, Common Message Switch 103 and Common Access Point 186. If the clearing firm and sponsoring firm are different, the sponsoring firm may also receive a copy of the execution report. The timing for receipt of execution reports may differ for clearing and sponsoring firms, with some reports nearly instantaneous, and other reports delayed.

The execution report makes use of the mnemonic of the exchange member (101) submitting the order to ensure it is correctly routed. Exchange member 101 records the execution report information and matches the report with the proper non-member institution (109) and then forwards the execution report to the non-member institution.

In one embodiment, computer terminals 120 are traditional computer workstations, which include a central processor unit (CPU) 122, memory 124 (RAM, ROM or both), data storage 126, removable data storage media 128 and input/output ports 130. These components are interconnected in terminal 120 by a system/data bus 132. Terminals 120 are interconnected at the non-member institution by a wired or wireless local area network (LAN) or wide area network (WAN) 134. The various terminals 120 of non-member institution 109 are electronically linked to member(s) of the exchange 101 by appropriate wired or wireless data transmission and reception equipment 136. In the illustrated embodiment, this includes a transmitter 138 and a receiver 140, which are configured to exchange data or information between the non-member institution 109 and the member of the exchange 101.

Exchange member 101, also has computer terminals 150, which are similar to terminals 120 at the non-member institution. Terminals 150 are used by operators at exchange member 101 in processing orders or securities transactions including those from non-member institution 109. Terminals 150 include a central processor unit (CPU) 152, memory 154 (RAM, ROM or both), data storage 156, removable data storage media 158 and input/output ports 160. These components are interconnected in terminal 150 by a system/data bus 162. Terminals 150 are interconnected at exchange member by a wired or wireless local area network (LAN) or wide area network (WAN) 164.

The various terminals 150 of exchange member 101 are electronically linked to non-member institution 109 by appropriate wired or wireless data transmission and reception equipment 166. In the illustrated embodiment, this includes a transmitter 170 and a receiver 168, which are configured to exchange data or information between the exchange member 101 and the non-member institution 109.

Exchange member 101 also includes wired or wireless electronic links to the Common Access Point 186 of the exchange by appropriate data transmission and reception equipment 180. This includes a transmitter 182 and a receiver 184, which are configured to exchange data or information between exchange member 101 and similar data transmission and reception equipment of Common Access Point 186. Common Access Point 186 provides a standardized set of access protocols for the electronic connection of different entities to the exchange.

In FIG. 1, transmitters 138, 170, 182 and receivers 140, 168, 184 are illustrated as separate pieces of equipment. However, the state of data transmission equipment is such that a single piece of equipment may typically perform both transmission and reception functions using a common media, such as coaxial cable, fiber optic cable or twisted pair wiring. In this configuration, it may be difficult to separate a transmitter from a receiver. The equipment or device may be a single piece of equipment performing both functions. However, depending on the data exchange format and media it is also possible that there are separate transmitters and receivers, such as for satellite, microwave or infrared.

In FIG. 1, it is also understood that there are non-illustrated elements of exchange member 101, non-member institution 109, Common Access Point 186, Common Message Switch 103, SuperDot 105 and floor point of sale device 107. It is further understood that multiple non-member institutions may be connected to a single exchange member, and the multiple exchange members are connected to Common Access Point 186. It is also possible a non-member institution has connections to more than one exchange member. It is also possible that an exchange member has connections to more than one exchange. It is further possible that different exchanges have connections with each other.

In one embodiment, Common Access Point 186 is a state of the art communications infrastructure that serves as a universal bridge between the business services of the NYSE and the networks of NYSE members, sponsored non-members (e.g., institutions, brokers/dealers, and individual investors), and vendors. Common Access Point is specifically designed to simplify member firm access to a variety of NYSE systems and services using industry-standard protocols and structured data formats. Also, the design of Common Access Point enables member firms to access NYSE business services while maintaining the security and operational integrity of NYSE systems and networks. Common Access Point supports (a) multiple types of connections through multiple providers, (b) multiple types of sessions, and (c) multiple messaging standards over a common Transmission Control Protocol/Internet Protocol (TCP/IP) network.

Order information flowing to and from the NYSE is supported in the Floor Communication Standard (FCS) message format traditionally used by the NYSE or in the industry-standard Financial Information eXchange (FIX) message format. Other formats are supported as they become widely accepted and utilized in the securities industry.

Common Access Point authenticates incoming connections from hosts, secure sessions and individual users. It also provides appropriate data confidentiality, and ensures the integrity of NYSE systems against external threats. Common Access Point does not ensure the integrity of member firm systems and networks attached to Common Access Point—this is the responsibility of the member firm. Common Access Point supports a range of options for identification of an individual user, for strongly authenticated sessions, and for data confidentiality.

Member firms can choose to connect to Common Access Point either directly, through a financial service bureau, through a public extranet provider, or through an Internet Service Provider (ISP), depending upon their needs. Depending on the access method, a variety of physical connection types are supported, ranging from dial-up (via third parties) to 155 Mbps circuits. When the member firm's business requirements warrant it, a member firm can run multiple NYSE business services over a single physical connection. Common Access Point is reachable at two sites, and redundant paths from multiple member firm lines or sites are available.

The information carried in a messaging format such as FIX is conveyed to the exchange via a "session-layer" protocol that then uses TCP and IP to deliver the data. Common Access Point supports a number of session protocols to meet a range of potential needs, including Simple Mail Transfer Protocol (SMTP; e-mail), Secure Sockets Layer (SSL; Web-style secure sockets), secure shell (SSH), FIX session, and X11 (X-Windows). These session protocols are used to provide security services and a measure of standardization between the network and the application.

One role of the Common Message Switch (CMS) 103 is to receive, validate and pass orders and administrative messages received from member firms to other exchange systems. In addition, CMS sends Execution Reports, responses to administrative messages, and status messages back to the member firms.

The Common Message Switch is a central portal through which member firms communicate with the exchange computer systems when placing orders and executing trades.

The Common Message System connects to each member firm via Common Access Point and dedicated lines that handle all of the traffic to and from the exchange. This ensures that the traffic to and from the member firms is kept private and isolated from any interference. The line can be defined for use by a single mnemonic, or for additional mnemonics where order flow needs to be segregated.

The system illustrated in FIG. 1 provides support for electronic order submission from an institution through a member to the exchange. Institutions also have other less automated techniques for order submission, which are not illustrated. For example, institution 109 can place a call to a broker of member 101 and then place a securities order. The member broker can then send the institution order to their desk or floor broker located on the exchange floor 107, frequently by telephone or dedicated circuit, and the floor broker then takes the institution order to the specialist trading post for that particular security where the order is executed according to the floor auction. It is also possible that the order is a mix of telephone and electronic, with the broker receiving the order by telephone and then electronically entering the order and then passing it to the exchange.

The system of the instant invention has advantages over all of these known systems. As compared to the telephone order entry by the institution, and execution by the broker on the floor, the instant invention is faster. As compared to the automated order submission illustrated in FIG. 1, or telephone and automated entry, the instant invention may not be faster, but in one embodiment, it provides anonymity to the institution. Additionally, in one embodiment the instant invention provides anonymity to the member, and in another embodiment the instant invention provides anonymity to both the institution and the member. These aspects and advantages of the invention are explained in greater detail with reference to FIGS. 2 through 12.

Figure 2:
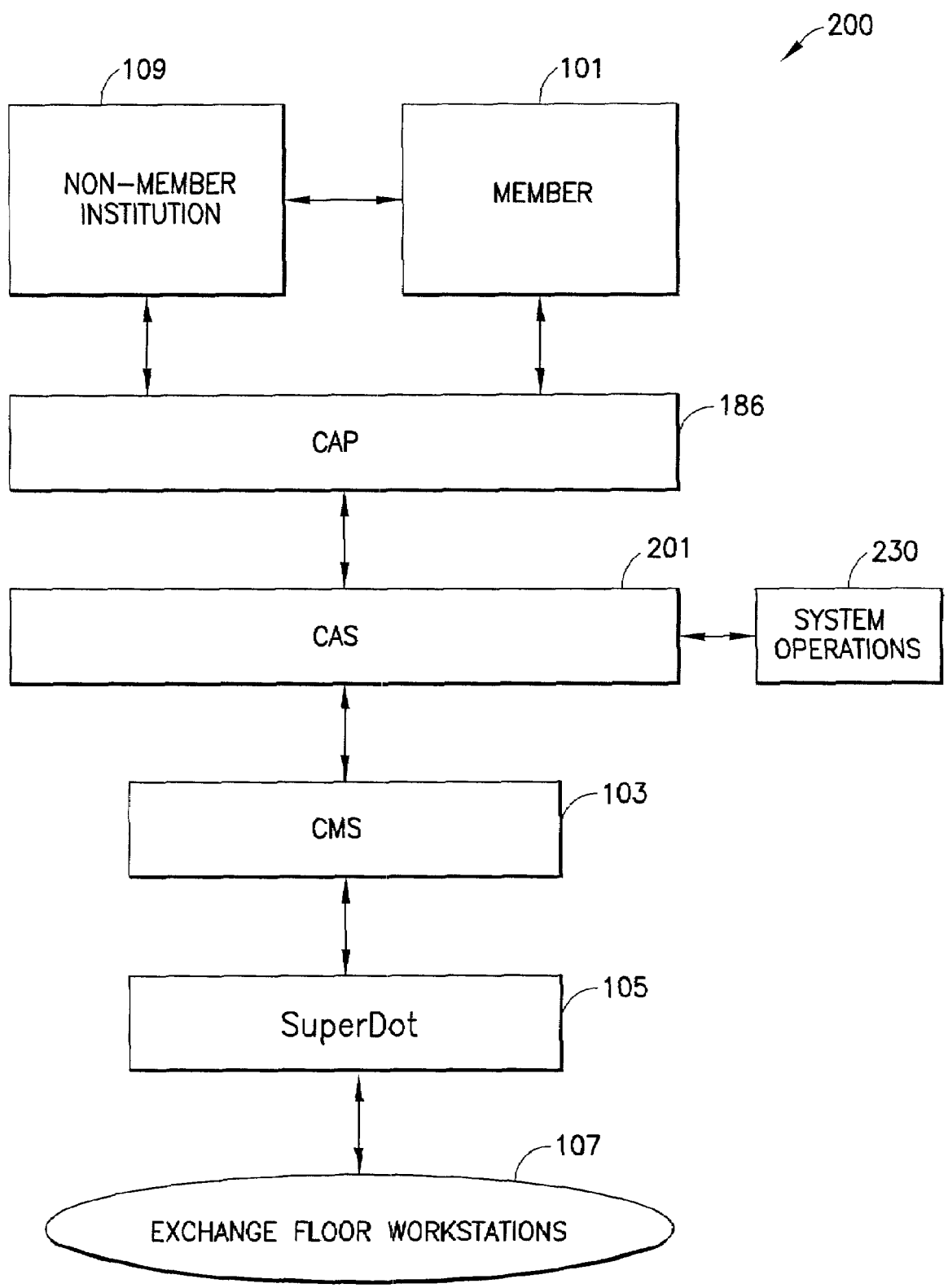
FIG. 2 illustrates an embodiment of a system according to the instant invention.

Referring to FIG. 2, one embodiment of system 200 of the instant invention allows a non-member institution 109 to send orders or securities transactions to a floor point of sale device 107, once it has successfully passed the Credit Authorization Service (CAS) 201. Because the regulations and rules require all transactions or orders to come from an exchange member, Credit Authorization Service 201 acts as the "member" according to the instant invention. As such, the Credit Authorization Service 201 is placed "logically" in the information path between the non-member institution 109 and the exchange floor 107. When the non-member institution transaction first arrives at Credit Authorization Service 201, there is a non-member institution mnemonic attached to the transaction. However, there may or may not be a member mnemonic attached to the transaction. Thus, in one embodiment, one of the functions of system 200 may include attaching a member firm mnemonic to the transaction before the transaction reaches the exchange floor, if one is not already attached.

Before the order reaches the exchange floor, system 200 removes, masks or replaces the non-member institution's mnemonic or identity with an acronym for Anonymous DOT. This masking or removal is performed by Common Access Point 186, Credit Authorization Service 201, Common Message Switch 103 or SuperDot 105 according to various embodiments. In one embodiment, an exchange clearing member firm 101 mnemonic, identifiable with the member firm, remains on the order or transaction. In another embodiment, both the institution and the exchange clearing member firm mnemonic or identity are altered or masked so that their identities are not readily apparent. After the order has passed the Credit Authorization Service criteria, the order is forwarded to point of sale devices 107 on the trading floor for processing.

Credit Authorization Service 201 is administered and managed by the exchange, but this is performed for the exchange members. Thus, Credit Authorization Service 201 is an extension of the exchange members and under the control of the exchange members, providing credit authorization services for the exchange members, and providing trading anonymity for non-member institutions. In this manner, individual orders or transactions are still sponsored on the exchange by an exchange member, but the individual orders or transactions are not directly presented to the exchange by the individual sponsoring exchange member.

Although not illustrated, in one embodiment, Credit Authorization Service 201 is also a computer terminal, and includes a computer system, with associated CPU, memory, data storage, removable media, and input/output ports, as well network interface cards (NIC). This configuration allows Credit Authorization Service 201 to exchange data or information between exchange member 101, non-member institution 109, Common Access Point 186, Common Message Switch 103 and system operator terminal 230. Internally, Credit Authorization Service 201 includes a data/information bus, which interconnects the computer system with communication ports providing communication between Credit Authorization Service 201 and non-member institution 109, exchange member 101, via Common Access Point 186, system operator terminal 230 and Common Message Switch 103 respectively. The communication ports include transmitters as well as receivers. These ports are any of the known types of wired or wireless data transmission equipment that are suitable for exchange of data, information or messages between different systems. Of course, these communications may be encrypted or secure.

Figure 3:
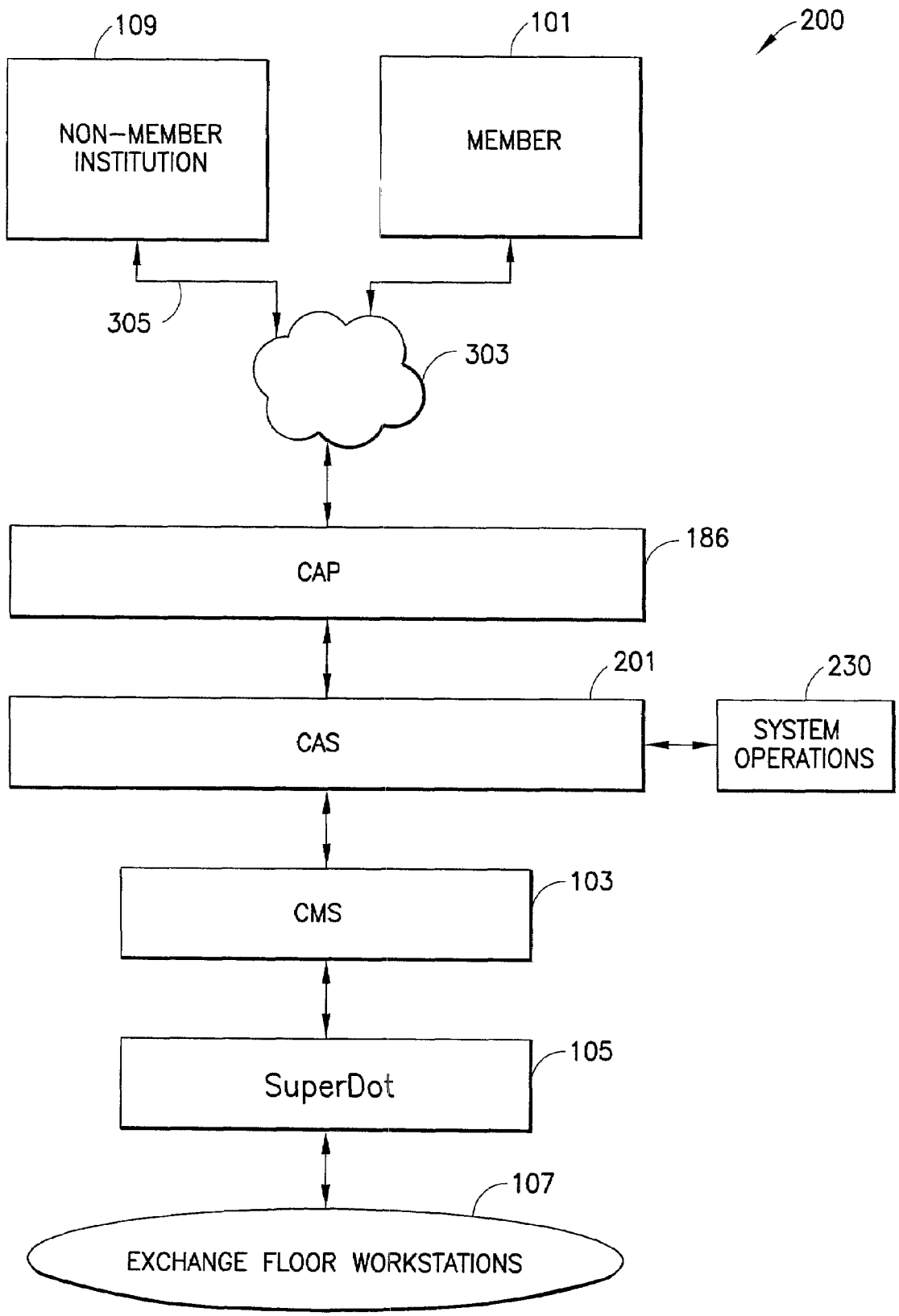
FIG. 3 illustrates an embodiment of a system according to the instant invention.

In one embodiment, illustrated in FIG. 3, system 200 does not rely on special purpose communication interconnection equipment, but is configured to take advantage of a common information interconnection network 303. Today, that network 303 is termed the Internet. In the future, it may be an enhancement or modification of the Internet, which provides a grid or network of interconnections between different users.

In the embodiment illustrated in FIG. 3, non-member institution 109 has a connection 305 to network 303, which may be used for information exchange with many other entities and for many other purposes beyond the mere transmission and receipt of order or transaction information. Connection 305 may be a universal information connection, which forms virtual connections based on message headers or routers contained with or embedded in the information. An interface at non-member institution 109 may be a wired or wireless connection and may include various security and encryption functions. The same or similar type of interface is provided at exchange member 101 and Common Access Point 186 respectively.

Figure 4A:
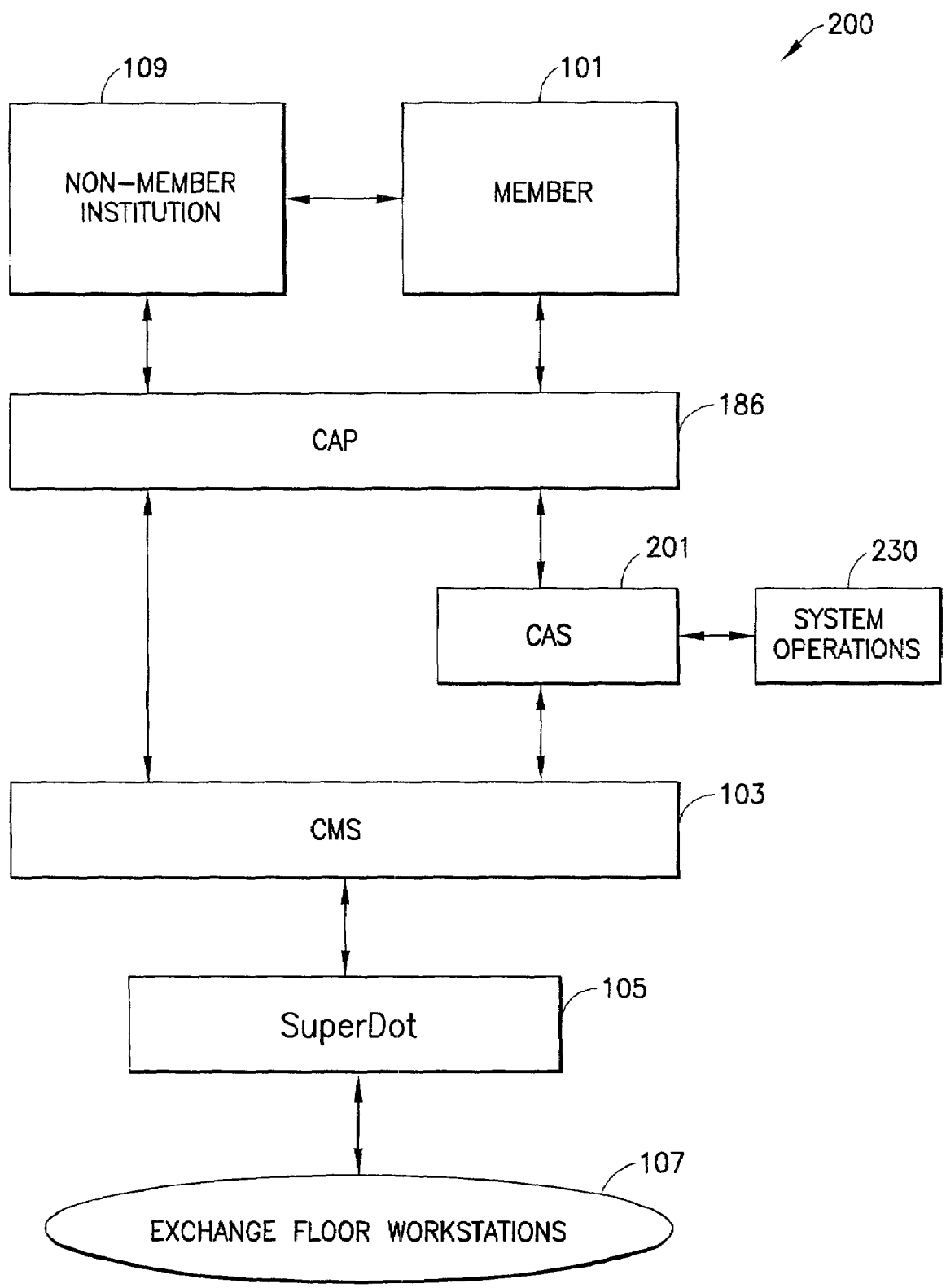
FIG. 4A illustrates an embodiment of a system according to the instant invention.

Referring to FIG. 4A, an embodiment of system 200 includes connections between non-member institution 109 and Common Access Point 186. These connections link non-member institution 109 with Common Message Switch 103, without a direct connection to Credit Authorization Service 201. Member 101 is connected to Credit Authorization Service 201 through Common Access Point 186. In this embodiment, a securities transaction from non-member 109 is passed through Common Access Point 186 to Common Message Switch 103, where Common Message Switch 103 queries the pre-established authorization threshold level, established by member 101 and accessible to Credit Authorization Service 201. Not illustrated in FIG. 4A is a path for regular transactions from member 101 through Common Access Point 186 to Common Message Switch 103, that does not include Credit Authorization Service 201.

Figure 4B:
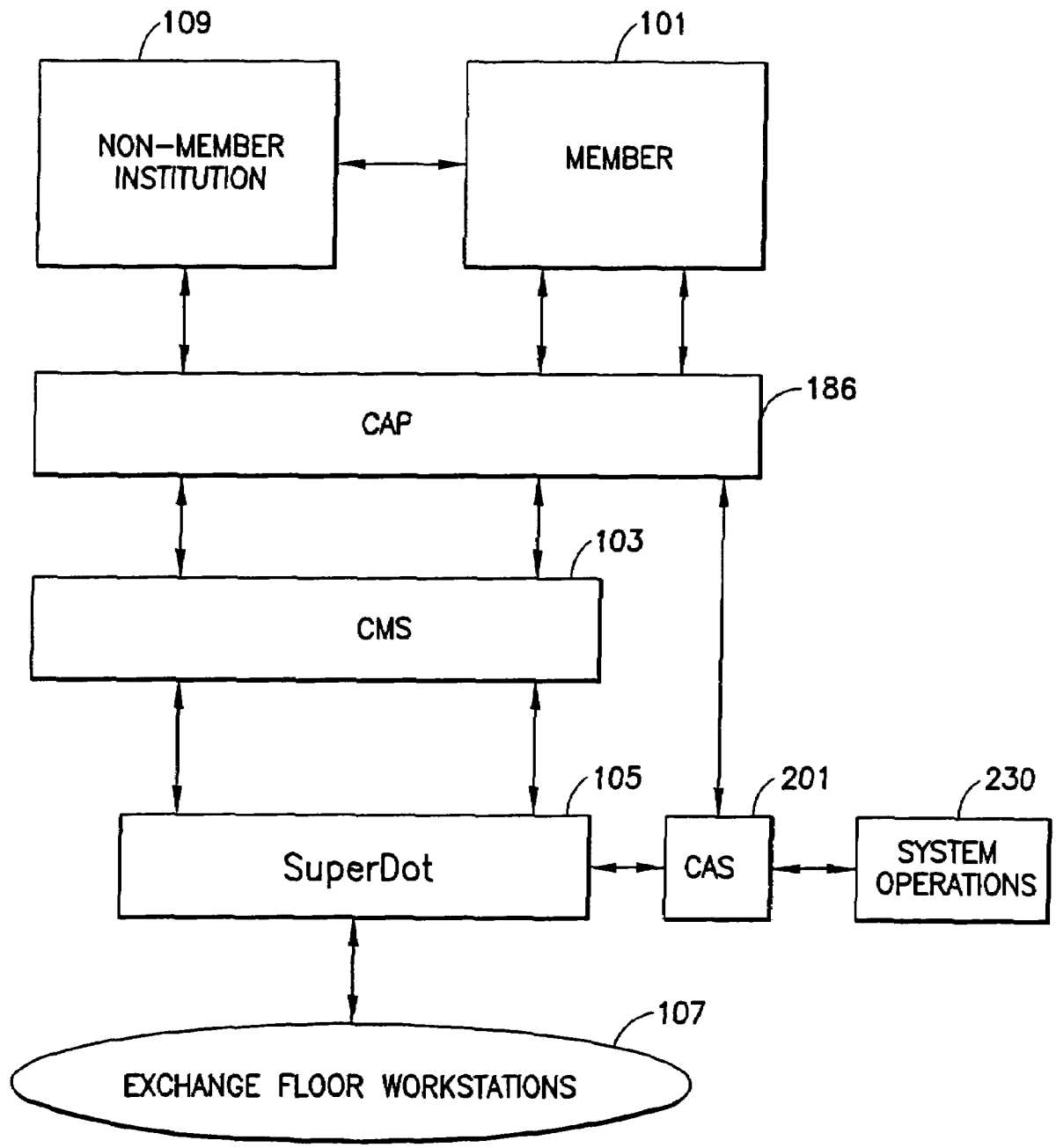
FIG. 4B illustrates an embodiment of a system according to the instant invention.

Referring to FIG. 4B, an embodiment of system 200 includes connections between non-member institution 109 and Common Access Point 186. These connections link non-member institution 109 with Common Message Switch 103 and SuperDot 105, without a direct connection to Credit Authorization Service 201. Member 101 is connected to Credit Authorization Service 201 through Common Access Point 186. In this embodiment, a securities transaction from non-member 109 is passed through Common Access Point 186 and Common Message Switch 103 to SuperDot 105, where SuperDot 105 queries the pre-established authorization threshold level, established by member 101 and accessible to Credit Authorization Service 201. Also illustrated in FIG. 4B is a path for regular order transactions from member 101 through Common Access Point 186 and Common Message Switch 103 to SuperDot 105, that does not include Credit Authorization Service 201.

A Method of the Invention

Without the instant invention, when a non-member institution submits an order or securities transaction, it first comes through an exchange member, who either explicitly or implicitly decides for each transaction that is forward to the exchange that they will assume credit risk on the transaction. The instant invention helps by eliminating the need for an exchange member to handle and decide on every non-member institution securities transaction before the transaction is forwarded to the Common Messaging Switch, while continuing to provide member credit assurance for the order.

The embodiment described below uses a running aggregate, which generally increases in value with each transaction. With an increasing aggregate, securities transactions are processed when the running aggregate is below a threshold, and are rejected when the running aggregate is above the threshold. A person of ordinary skill would understand that it is equally possible to have a running aggregate that generally decreases in value with each transaction. With a decreasing aggregate, securities transactions are processed when the running aggregate is above a threshold, and are rejected when the running aggregate is below the threshold.

Accordingly the invention does not depend on whether buy or sell orders result in increases or decreases in the running aggregate, only that the orders are treated consistently so as to provide a measure of credit exposure measured against a threshold value.

FIG. 5 illustrates an embodiment of the method of the invention. In this embodiment, at steps 501, 503 non-member institution 109 and exchange member 101 use system 200 to coordinate and establish a credit authorization value threshold and a maximum allowable order size threshold. The negotiated maximum allowable order size threshold becomes the maximum order size (e.g., number of shares) that the non-member institution is authorized to submit to the Credit Authorization Service 201.

After the credit authorization value threshold and maximum order size threshold are established, then at step 505, exchange member 101 informs Credit Authorization Service 201 of the thresholds of the associated non-member institution.

At step 507, Credit Authorization Service 201 acknowledges the thresholds, and stores the information in a secure database.

At step 509, non-member institution 109 submits a securities transaction to Credit Authorization Service 201. The transaction includes an identity of the non-member institution, as well as the particulars of the desired transaction, such as the specific security trading identifier, the number of shares in the transaction, whether the transaction is a buy or sell, and any limits on the transaction.

At step 511, Credit Authorization Service 201 receives the transaction from non-member institution 109, adds or subtracts the transaction amount to the running aggregate as applicable, and compares the running aggregate with a percentage of the pre-established threshold value. The percentage may be anything any up to and including 100 percent of the threshold value. Credit Authorization Service 201 also checks to see if the order size exceeds the maximum authorized order size.

In one implementation, a running aggregate of transactions or orders from the non-member institution is maintained by the Credit Authorization Service 201. In determining whether it will process a particular transaction or order at step 513, Credit Authorization Service 201 considers whether the requested transaction, in view of the running aggregate, will exceed the threshold value, or a percentage (e.g., 75 percent) of the threshold value.

At step 513, if Credit Authorization Service 201 determines that the transaction value causes the running aggregate to exceed the threshold value or the percentage of the threshold value, then at step 515, Credit Authorization Service 201 informs exchange member 101 that the transaction exceeds the threshold value or the percentage of the threshold value.

In the test that is performed at step 513, there are at least two different embodiments. In one embodiment, system 200 determines whether the transaction exceeds the threshold value (i.e., 100 percent of the threshold value). In another embodiment, system 200 determines whether the transaction exceeds something less than 100 percent of the threshold value (e.g., 75% of the threshold value). A percentage less than 100 percent is established to alert the exchange member when the running aggregate for the non-member institution is approaching the threshold value. One advantage of using and testing for a lesser percentage of the threshold value is that this provides an opportunity for the exchange member to take actions that will adjust the credit authorization value threshold before any transaction actually exceeds the threshold.

At step 519, exchange member 101 acknowledges being informed that the transaction exceeds a percentage of the threshold value.

Based on this information, at step 521, exchange member 101 makes a determination whether to grant additional credit and modify the credit authorization value threshold.

If exchange member 101 decides not to modify the credit authorization value threshold, the method stops at step 523, although the particular transaction may be processed according to the rest of the invention.

Alternatively, if exchange member 101 decides they are willing to modify the credit authorization value threshold, the method returns to step 503 to coordinate a new pre-established credit authorization value threshold with non-member institution 109.

In one embodiment, after informing the exchange member that the transaction exceeds a percentage of the threshold value at step 515, then at step 517, Credit Authorization Service 201 also informs non-member institution 109 that the transaction exceeds a percentage of the threshold value.

At step 525, non-member institution 109 acknowledges the information from Credit Authorization Service 201 and then at step 527 determines whether to seek additional credit from exchange member 101.

If non-member institution 109 decides not to seek additional credit, the method stops at step 529, although the particular transaction may proceed according to other aspects of the invention.

Alternatively, if a modified credit authorization value threshold is desired, then system 200 returns to step 501 to coordinate a new pre-established threshold value with exchange member 101.

If at step 513, Credit Authorization Service 201 determines that the transaction value does not cause the running aggregate to exceed the pre-established threshold value or a percentage of the pre-established threshold value, then the transaction can move to the next steps before being sent to the trading floor point of sale devices 107. Embodiments of these next steps are illustrated in FIG. 6.

If the test at step 513 is for a percentage of the threshold value, (i.e., less than 100 percent), then system 200 also includes a test at step 530, where system 200 tests to see if the transaction actually exceeds the threshold value. If the transaction does not exceed the threshold value, then system 200 determines at step 532 whether the transaction exceeds another threshold value. For example, the exchange member may limit the number of shares in an individual order (order size). Alternatively, the exchange member may limit the volume of trading in particular stocks, or may limit trading to only particular stocks.

If the order passes both tests at steps 530 and 532, the transaction can move to the next steps before being sent to the trading floor point of sale devices 107. Embodiments of these next steps are illustrated in FIG. 6.

Alternatively, if at step 530, system 200 determines that the transaction exceeds the threshold value, system 200 rejects the transaction.

Similarly, if at step 532, system 200 determines that the order exceeds another limit, such as the maximum authorized order size, system 200 also rejects the transaction.

Referring now to FIG. 6, at step 601, system 200 first removes the non-member mnemonic from the securities transaction and substitutes a mnemonic that stands for anonymous DOT. This ensures anonymity for the originator of the transaction. In one embodiment, system 200 retains the mnemonic of a clearing exchange member 101 on the transaction. In another embodiment, the mnemonic of the clearing exchange member 101 is also masked or removed. However, regardless of whether the mnemonic is masked or removed, system 200 has knowledge of the identity of clearing exchange member 101 so that the other exchange members are assured that the order or transaction will be honored.

Then, at step 603, system 200 forwards the securities transaction to exchange floor point of sale devices 107 via SuperDot 105. Once the transaction has been forwarded to the floor for execution, system 200 follows one of three possible embodiments.

In the first of three illustrated embodiments, at step 605, system 200 merely adds the transaction amount to the running aggregate. In this embodiment, there is no consideration for the type of transaction (e.g., whether it is a buy or a sell transaction). In this embodiment, system 200 accepts limit orders, so that if the transaction executes, the amount of the transaction is known with certainty.

Next, system 200 returns to step 509 of FIG. 5 to wait for the non-member institution to submit another securities transaction.

In the second of three illustrated embodiments, after submitting the transaction to the floor for execution, then at step 607, system 200 determines whether the securities transaction is a cancel transaction. As such, a cancel transaction will reverse the effect of the transaction being cancelled. If the transaction is a cancel transaction and the transaction has not executed on the trading floor, then at step 609, system 200 adjusts the running aggregate to reverse the transaction, effectively erasing the transaction, and leaving the running aggregate as it was before the cancelled transaction.

Alternatively, if system 200 determines at step 607 that the transaction is not a cancel transaction, then at step 611, system 200 adds the transaction amount to the running aggregate. Just as in the first embodiment illustrated in FIG. 6, this is only available when the securities transaction is a limit order and the amount of the transaction can be determined with certainty.

Next, system 200 returns to step 509 of FIG. 5 to wait for the non-member institution to submit another securities transaction.

In the third embodiment illustrated on FIG. 6, at step 613, after submitting the transaction to the floor for execution, then at step 613, system 200 determines whether the securities transaction is a cancel transaction. As such, a cancel transaction will reverse the effect of the transaction being cancelled. If the transaction is a cancel transaction and the transaction has not executed on the exchange floor, then at step 615, system 200 adjusts the running aggregate to reverse the transaction, effectively erasing the transaction, and leaving the running aggregate as it was before the cancelled transaction. Although not specifically illustrated, system 200 may also accommodate a cancel with replace transaction.

Alternatively, if system 200 determines at step 613 that the transaction is not a cancel transaction, then at step 617, system 200 determines the value of the actual transaction and adjusts the running aggregate by the amount of the actual transaction. In this embodiment, it is possible to take account of the actual market execution price and adjust the running aggregate accordingly. In this manner, the running aggregate will more closely reflect that actual securities transactions and actual credit exposure of the exchange member, rather than the maximum possible credit exposure of the exchange member. In this embodiment, market orders are readily accommodated and the running aggregate is adjusted according to the execution price at the market.

Next, system 200 returns to step 509 of FIG. 5 to wait for the non-member institution to submit another securities transaction.

Not illustrated in FIGS. 5 or 6 are the steps for transaction or order confirmation, audit and order reconciliation. In the order or transaction confirmation process the executed transaction information is sent from the exchange floor to the non-member institution. The confirmation steps are somewhat a reverse of the order steps and involve sending the confirmation from the exchange floor through SuperDot 105, Common Message Switch 103, Credit Authorization Service 201 and Common Access Point 186. As the order is processed, it is matched with the non-member identity so that the confirmation can be forwarded to non-member institution 109.

In one embodiment, the order confirmation information is also provided to exchange member 101 in a summary at the end of the day. In another embodiment, the order confirmation information is provided to the exchange member in a summary at regular intervals through the day. Thus, the non-member institution will typically receive the order confirmation almost instantly, while the exchange member will receive order and order confirmation information after a delay.

The database(s) used to maintain the credit authorization files for system 200 can have a number of different structures and organizations. In the embodiments illustrated herein, the data structure will be illustrated as flat-files. However, those of ordinary skill will understand that a relational database will serve equally well, and may provide certain advantages in the terms of data accuracy for redundant data and total file size over a flat file database. Thus, the instant invention is not limited to the illustrated flat file type of data structures.

One embodiment of the database structure and organization is illustrated in FIG. 7. In this embodiment, there is a data field 701 for the name of the non-member institution, with a corresponding mnemonic data field 703 for the non-member institution. For each non-member institution that will take advantage of the instant invention, there is a data field for at least one sponsoring exchange member 705. Each exchange member has a corresponding mnemonic 707. In a negotiated agreement between the exchange member and the non-member institution, a threshold value 709 is established, and any corresponding percentage of the threshold value 711, for alerts. Also during the negotiation, the parties may establish a maximum order size 713.

As illustrated, the parties may set the percentage for alert at some value less than 100%, they may set the percentage for alert at 100%, or they may set both alerts. The parties may set the maximum order size to a relatively small size or value, or a relatively large size or value. By setting the maximum order size to a very large number, the exchange member may effectively eliminate all practical limits on order size.

Although not illustrated, the parties may also agree on limits that are tied to particular stocks.

As illustrated, it is possible for a particular non-member institution to have more than one sponsoring exchange member. This is illustrated for non-member institution, instA 715, who is identified as having two sponsoring exchange members (member 1 and member 2). As illustrated, the threshold values that are negotiated between instA and each exchange member (member 1 and member 2) are independent of each other.

As discussed elsewhere, non-member institution is a term used in the patent as a short-hand for any securities trader who is not a member of the exchange. As such, the non-member institution may be a bank, retirement investment account manager, mutual fund manager, part of a member firm that does not otherwise have trading privileges, or it may be an individual investor with their individual investment portfolio. Thus, in the example, non-member mnemonic PRIVA stands for a private investor.

Once the exchange member and non-member institution arrive at threshold values 709, 713 and alert percentages 711, the exchange member submits that information to the Credit Authorization Service 201, where it is stored in an electronic database, which is readily accessible to the Credit Authorization Service. The information may also be available to the exchange member and the non-member institution, although the non-member institution is not able to alter the information.

In the discussion above, with reference to FIG. 6, the invention disclosed three different embodiments for aggregating individual transactions. Those three different embodiments (C, C' and C") provided for different aggregation techniques. Each of those different aggregation techniques are further explained with reference to FIGS. 8, 9 and 10.

Referring now to FIG. 8, which corresponds generally to embodiment C of FIG. 6, system 200 maintains individual aggregation accounts for each non-member institution.

For each trading day 800, the name of the non-member institution 801 and associated mnemonic 803, as well as the sponsoring exchange member 805 and exchange member mnemonic 807 are linked to each other. Although not illustrated, if the clearing member and sponsoring member are different, an associated mnemonic for the clearing member will also be linked.

The threshold values 809 and alert percentage 811, which were previously established between the exchange member and the non-member institution are also linked to the daily aggregation.

A beginning aggregate value 813 establishes the value at the beginning of the trading day. This aggregate value is adjusted in a running aggregate 815 over the course of the day, based on individual orders or securities transactions 817.

At the end of the trading day, the value of the running aggregate is used as an input in determining the beginning aggregate for the next trading day. The value of the beginning aggregate depends on the reconciliation process and in particular whether the invention uses a T+1 or T+3 reconciliation.

In the embodiment illustrated in FIG. 8, all transactions are added to the running aggregate (producing an increasing aggregate), regardless of transaction type. Thus, even though a buy order may increase the credit risk to the sponsoring exchange member and a sell order may decrease the credit risk to the sponsoring exchange member, every transaction is assumed to be the same type transaction (i.e. a buy). In this embodiment, system 200 does not need to know whether the particular transaction is a buy or a sell. However, system 200 does need to know the limit or execution price of the transaction (which establishes the value of that particular transaction) and also needs to know the number of shares in the transaction. Using this information, in the embodiment illustrated in FIG. 8, system 200 can determine the maximum credit risk for the exchange member and can prevent or reject transactions that will exceed that maximum credit risk.

As illustrated in FIG. 8, on trading day 206, non-member institution instB, starts the day with a beginning aggregate value (813) of 185. As each transaction over the course of the day is processed, system 200 determines the value of the transaction and adds the absolute value of the transaction to the running aggregate (815). Thus, assuming that there are no rejected transactions, at the end of the trading day, the sum of the absolute value of each transaction has been added to the beginning aggregate value. In this embodiment of system 200, a cancel transaction amount or value of the cancelled transaction is also added to the running aggregate. As stated elsewhere, this embodiment accounts for the maximum possible value of any transaction and thus provides a conservative estimate of the maximum credit risk for the exchange member.

In the embodiment illustrated in FIG. 8, as the daily transactions are processed by system 200, it can be seen that with a threshold value (809) of 300 and a percentage alert (811) of 80%, any transaction that will take the running aggregate above 240 (i.e., 80% of 300) will generate an alert. Thus, when system 200 receives the sell transaction (819) for 4 from non-member institution INB, the running aggregate of 241 will exceed the percentage alert value of 240. At this point, system 200 will send an alert message to exchange member 101, and possibly also to non-member institution 109, to inform them that the most recent transaction has crossed the 80% threshold value. The alert message(s) may be nearly instantaneous, or delayed. This provides an opportunity for the exchange member to establish a new threshold value and avoid having the institution exceed the threshold value and having a transaction of the non-member institution rejected.

In the embodiment illustrated in FIG. 8, although the alert threshold was crossed, the running aggregate (815) for the remainder of the trading day did not exceed the 100% threshold value of 300, thus no transactions are rejected as exceeding the threshold value.

The embodiment identified as C' in FIG. 6 is further illustrated in FIG. 9. In this embodiment, the running aggregate and accounting is similar to that illustrated in FIG. 8, except for the manner of handing cancel transactions. In the embodiment of FIG. 8, a cancel is added to the running aggregate and is thus treated like all other transactions. In the embodiment of FIG. 9, buy and sell transactions are both added to the running aggregate and treated the same. However, a cancel transaction is used to reverse the effect of the transaction, and are thus subtracted from the running aggregate. Thus we see that the amount applied for the cancel transaction (902) in FIG. 9 is negative, while the same cancel transaction (821) in FIG. 8 is positive. Otherwise the two embodiments (C and C') illustrated in FIGS. 8 and 9 respectively are virtually identical.

In the third embodiment (C"), illustrated in FIGS. 6 and 10, the actual value of the individual orders are applied to the running aggregate. In this manner, the running aggregate more closely reflects the actual credit risk of the sponsoring exchange member. However, this embodiment requires a source to determine the actual transaction execution price or value, such as a quote stream or the execution reports.

A quote stream is used to establish the value of the order before the order is executed, and the actual execution value from the execution report is used to adjust the running aggregate after the order is filled. In the case of an initial public offering, the value of the order is a database value.

As illustrated in FIG. 10 the running aggregate closely or identically reflects the netted transactions for the non-member institution. In this manner, system 200 can very closely monitor the actual credit risk of the sponsoring exchange member. Based on this more accurate technique, it may be possible for the non-member institution and the exchange member to agree on lower threshold values (and any associated collateral requirements).

The invention envisions at least two different reconciliation cycles. One cycle is T+3, the other is T+1. FIG. 11 illustrates the embodiment where transactions are reconciled by Credit Authorization Service 201 on a T+3 cycle.

Referring to FIG. 1 and using the embodiments illustrated in FIGS. 7 and 8 on day 206, we see a beginning aggregate value of 185, which was calculated at the end of trading day 205. As illustrated in FIG. 8, over the course of trading day 206, non-member institution "INB" had a running aggregate that eventually reached 264 (823). This reflected individual transactions, which summed to 79 (825). To reconcile the aggregate value for the beginning of trading day 207, system 200 then looks at the aggregate of transactions from three trading days earlier (i.e. trading day 204) and adjusts (subtracts) the ending aggregate on day 206 by that amount to establish the beginning aggregate for trading day 207.

The embodiment of FIG. 11, with a T+3 reconciliation cycle provides a multi-day transaction buffer.

In another embodiment for reconciliation, system 200 uses a T+1 cycle. This is illustrated in FIG. 12. In this embodiment, system 200 maintains a running aggregate over the course of a day. However, at the beginning of each trading day, system 200 reverts the beginning aggregate to zero. Thus, only the transactions for a particular trading day are included in the running aggregate and thereby considered against the threshold value and percentage alert.

As indicated, there are various embodiments of Credit Authorization Service 201 and the system of the instant invention. In one embodiment, the system and method supports limit orders (i.e., an order that will execute only at the "limit" price). In another embodiment, the system and method supports market orders (i.e., an order that will execute at the market price).

In another embodiment, the invention checks and verifies the order according to order size (number of shares) and total aggregate value of all orders using a series of tables mapping the authorization levels between a specific non-member institution and an exchange member. In another embodiment, the invention only checks for the value of the order.

In one embodiment, no buffer is applied to the order size criteria and an order submitted by an institution that exceeds the criteria will be rejected. In another embodiment, a buffer is provided on a stock basis.

In one embodiment, the threshold value, percentage of threshold value and order size are configurable according to parameters set through the exchange member- non-member institution relationship. An increase or decrease in any of those values can be set for one specific trading day or a new limit may be set. However, the Credit Authorization Service 201 will only accept a change in the value from the exchange member.

In one embodiment, the exchange member can upgrade the threshold value immediately after the threshold value is reached and the exchange member is notified. The non-member institution and the system operator will also be notified and the non-member institution can re-enter the order that caused the threshold value to be exceeded.

In one embodiment, the threshold value and any readjustment of the value is captured in the audit trail.

In one embodiment, the exchange member, non-member institution and system operator are notified by message of the current threshold value and remaining running aggregate when a percentage (e.g., 75% of the threshold value) is reached.

In one embodiment, the order size, threshold value and percentage of threshold value are changeable intra-day.

As previously noted, a series of alerts are sent to the exchange member and possibly the non-member institution when the running aggregate of orders submitted to Credit Authorization Service 201 is some percent of the threshold value. In one embodiment, system operations 230 only receives alerts when the threshold value is reached.

The exchange member has the ability to upgrade the threshold value immediately after transactions reach a percentage of the threshold value (e.g., 75 percent), and the exchange member is notified. Upon receipt of a copy of the threshold value limit alert, the exchange member is allowed to upgrade the threshold value. The non-member institution and system operations are notified and the non-member institution can re-enter the order that was valued greater than the threshold value.

Threshold Value and Running Aggregate Calculations

The dollar value of an order is calculated and added to or subtracted from the non-member institution's running aggregate in real-time.

In one embodiment, the order's value is added to the running aggregate (e.g., an increasing aggregate), regardless of whether the order is a buy or sell order.

In another embodiment, the running aggregate is only adjusted for cancels. There is no adjustment for cancel requests with replace or exact cost of the order based on execution price.

In one embodiment, at the end of the trading day the running aggregate left from that trading day is applied to the amount expended over the last three trading days to establish the running aggregate available at the beginning of the next trading day. Note: This timeframe is based on a T+3 settlement cycle.

In another embodiment, at the end of the trading day the running aggregate left from that trading day is applied to the running aggregate available at the beginning of the next trading day. Note: This timeframe is based on a T+1 settlement cycle.

In the embodiment which accepts only limit orders and cancels, there is no requirement for a quote stream. The order cost is calculated using the limit order price included in the order, because is it is assumed that the order executes at the limit price.

In another embodiment, the system accepts market orders, and system 200 uses a quote stream to determine a likely order cost, which is available from the quote stream. This allows system 200 to determine if the running aggregate, in view of the current order, is likely to exceed the threshold value, or a percentage of the threshold value.

In one embodiment, system 200 calculates both an expected and actual cost for the order, and uses those amounts to update the running aggregate. The expected cost is determined from the quote stream and the actual order cost is determined from the confirmation, based on the order execution price. Buys are added to the running aggregate and sells are subtracted from the running aggregate.

In one embodiment, order rejects (for reasons such as lack of sufficient data) and order cancels are reversed in the running aggregate.

In one embodiment, the system handles orders in U.S. dollars. In another embodiment, the system handles multiple currencies.

Although illustrative embodiments have been described herein in detail, it should be noted and will be appreciated by those skilled in the art that numerous variations, in addition to the variations and embodiments described above, may be made within the scope of this invention without departing from the principle of this invention and without sacrificing its chief advantages.

One such variation includes a terminal at the non-member institution or exchange member that is relatively simple, for example, a TTY terminal. In this embodiment, the terminal serves to merely convert transaction information entered by an operator into a form that is acceptable by system 200. This terminal may include security and encryption functions, but it does not include substantive computational capability.

Another such variation includes a terminal at the non-member institution or exchange member that has advanced computational capability, for example a high-end computer system running artificial intelligence software and automatically, or semi-automatically executing transactions based on market indicators or pre-planned strategies. This terminal may be a combination or number of networked computers operating as part of a larger investment and financial tracking system. In this embodiment, the terminal may be a massively parallel processor.

In the examples above, the threshold value and percentage of the threshold are relatively fixed and the running aggregate is used to account for individual orders or transactions. A person of ordinary skill would of course understand that it is also possible to adjust the threshold value, by adding to or subtracting from that threshold value the amounts corresponding to individual transactions, and providing alerts or messages when the threshold value reaches a pre-established level (reaching a percentage of the threshold value in the example above), or reaches zero (reaching the threshold value in the example above).

A person of ordinary skill will also understand that it is possible that there is no running aggregate and that an individual transaction or order will be compared directly to the threshold value, with system 200 determining whether to submit the order to the exchange floor based only on that comparison.

A person of ordinary skill will also understand that there is no significant limit on the types of orders envisioned, including: day orders, crossing sessions and good till close orders.

A person of ordinary skill will also understand that the invention is applicable to multiple threshold levels, such as a low level threshold to inform the sponsoring member that the non-member institution is trading, a mid level threshold to inform the sponsoring member that the running aggregate has reached a level that may cause orders to be rejected, and a high level threshold where orders are rejected.

A person of ordinary skill will also understand that a threshold may not be only a dollar amount but may include numbers of shares of a particular security, or numbers of shares of a group of securities in a particular sector or group.

Unless otherwise specifically stated, the terms and expressions have been used herein as terms of description and not terms of limitation. There is no intention to use the terms or expressions to exclude any equivalents of features shown and described or portions thereof and this invention should be defined in accordance with the claims that follow.

We claim:

1. A method performed by a member securities exchange for processing a non-member transaction on the member securities exchange where all securities transactions must be backed by credit of the member, the method comprising:
   transmitting a securities transaction from the non-member institution to a credit authorization service of the exchange, the credit authorization service:
   comparing a value of the securities transaction with a pre-established threshold value, the pre-established threshold at least partially established by a member of the exchange; and
   removing or masking an identity of the non-member institution and processing the securities transaction backed by credit of the member if the value of the securities transaction is below the pre-established threshold, or alternatively;
   rejecting the securities transaction if the value of the securities transaction is above the pre-established threshold; and
   receiving at the non-member institution a message from the credit authorization service, the message including an indication that the securities transaction was processed or rejected.

2. A method according to claim 1, wherein the securities transaction is a limit order.

3. A method according to claim 1, wherein the securities transaction is a market order.

4. A method according to claim 1, wherein the pre-established threshold value is constant for the duration of a trading day.

5. A method according to claim 1, wherein the pre-established threshold value is adjustable during a trading day.

6. A method according to claim 1, wherein the pre-established threshold value is completely established by the member of the exchange.

7. A method according to claim 1, further comprising including a value of the securities transaction in a running aggregate.

8. A method according to claim 7, further comprising receiving a notification when the running aggregate reaches the pre-established threshold value.

9. A method according to claim 7, further comprising receiving a notification when the running aggregate reaches a percentage of the pre-established threshold value.

10. A computer-readable medium having computer executable software code stored thereon, the code executed by a member securities exchange for processing a non-member transaction on the member securities exchange where all securities transactions must be backed by credit of the member, the code comprising:

code to transmit a securities transaction from the non-member institution to a credit authorization service of the exchange, the credit authorization service including:

code to compare a value of the securities transaction with a pre-established threshold value, the pre-established threshold at least partially established by a member of the exchange; and code to remove or mask an identity of the non-member institution and process the securities transaction backed by credit of the member if the value of the securities transaction is below the pre-established threshold, or alternatively;

code to reject the securities transaction if the value of the securities transaction is above the pre-established threshold; and code to receive at the non-member institution a message from the credit authorization service, the message including an indication that the securities transaction was processed or rejected.

11. A programmed computer operated by a member securities exchange for processing a non-member transaction on the member securities exchange where all securities transactions must be backed by credit of the member, comprising:

a memory having at least one region for storing computer executable program code; and a processor for executing the program code stored in the memory, wherein the program code comprises:

code to transmit a securities transaction from the non-member institution to a credit authorization service of the exchange, the credit authorization service including:

code to compare a value of the securities transaction with a pre-established threshold value, the pre-established threshold at least partially established by a member of the exchange; and code to remove or mask an identity of the non-member institution and process the securities transaction backed by credit of the member if the value of the securities transaction is below the pre-established threshold, or alternatively;

code to reject the securities transaction if the value of the securities transaction is above the pre-established threshold; and code to receive at the non-member institution a message from the credit authorization service, the message including an indication that the securities transaction was processed or rejected.

12. A method performed by a member securities exchange for processing a non-member transaction on the member securities exchange where all securities transactions must be backed by credit of the member, the method comprising:

receiving at a credit authorization service of the exchange, a securities transaction from a non-member institution;

comparing a value of the securities transaction with a pre-established threshold value, the pre-established threshold at least partially established by a member of the exchange; and removing or masking an identity of the non-member institution and processing the securities transaction backed by credit of the member if the value of the securities transaction is below the pre-established threshold, or alternatively;

rejecting the securities transaction if the value of the securities transaction is above the pre-established threshold.

13. A method according to claim 12, wherein processing the securities transaction further comprises removing or masking an identity of the member of the exchange from the securities transaction.

14. A method according to claim 12, wherein processing the securities transaction further comprises forwarding the securities transaction to the member exchange.

15. A method according to claim 12, wherein the value of the securities transaction is a dollar value.

16. A method according to claim 12, wherein the value of the securities transaction is an order size.

17. A method according to claim 12, wherein the value of the securities transaction is a number of particular securities.

18. A method according to claim 12, wherein the securities transaction is a limit order.

19. A method according to claim 12, wherein the securities transaction is a market order.

20. A method according to claim 12, wherein the pre-established threshold value is constant for the duration of a trading day.

21. A method according to claim 12, wherein the pre-established threshold value is adjustable during a trading day.

22. A method according to claim 12, wherein the pre-established threshold value is completely established by the member of the exchange.

23. A method according to claim 12, further comprising receiving an instruction from the member of the exchange to adjust the pre-established threshold value after the securities transaction is rejected.

24. A method according to claim 12, further comprising receiving an instruction from the member of the exchange to adjust the pre-established threshold value before the securities transaction is rejected.

25. A method according to claim 12, further comprising notifying the member of the exchange when a running aggregate of multiple securities transactions reaches the pre-established threshold value.

26. A method according to claim 12, further comprising notifying the non-member institution when a running aggregate of multiple securities transactions reaches the pre-established threshold value.

27. A method according to claim 12, further comprising notifying a system operator when a running aggregate of multiple securities transactions reaches the pre-established threshold value.

28. A method according to claim 12, further comprising notifying the member of the exchange when a running aggregate of multiple securities transactions reaches a percentage of the pre-established threshold value.

29. A method according to claim 12, further comprising notifying the non-member institution when a running aggregate of multiple securities transactions reaches a percentage of the pre-established threshold value.

30. A method according to claim 12, further comprising maintaining an audit trail of actions by the member of the exchange or actions by the non-member institution.

31. A method according to claim 12, maintaining a running aggregate of multiple securities transactions.

32. A method according to claim 31, wherein the value of individual securities transactions are treated the same in maintaining the running aggregate regardless of the type of transaction.

33. A method according to claim 31, wherein the value of individual securities transactions is added to or subtracted from running aggregate depending on the type of transaction.

34. A method according to claim 31, wherein the value of individual securities transactions for buy orders and sell orders are treated the same in maintaining the running aggregate, but the value of individual securities transactions for cancel orders depends on the type of transaction.

35. A method according to claim 31, wherein the running aggregate is settled on a T+3 cycle.

36. A method according to claim 31, wherein the running aggregate is settled on a T+1 cycle.

37. A method according to claim 31, wherein the running aggregate is based on execution price.

38. A method according to claim 31, wherein the running aggregate is based on order price.

39. A computer-readable medium having computer executable software code stored thereon, the code executed by a member securities exchange for processing a non-member transaction on the member securities exchange where all securities transactions must be backed by credit of the member, the code comprising:
   code to receive at a credit authorization service of the exchange, a securities transaction from a non-member institution;
   code to compare a value of the securities transaction with a pre-established threshold value, the pre-established threshold at least partially established by a member of the exchange; and
   code to remove or mask an identity of the non-member institution and process the securities transaction backed by credit of the member if the value of the securities transaction is below the pre-established threshold, or alternatively;
   code to reject the securities transaction if the value of the securities transaction is above the pre-established threshold.

40. A programmed computer operated by a member securities exchange for processing a non-member transaction on the member securities exchange where all securities transactions must be backed by credit of the member, comprising:
   a memory having at least one region for storing computer executable program code; and
   a processor for executing the program code stored in the memory, wherein the program code comprises:
   code to receive at a credit authorization service of the exchange, a securities transaction from a non-member institution;
   code to compare a value of the securities transaction with a pre-established threshold value, the pre-established threshold at least partially established by a member of the exchange; and
   code to remove or mask an identity of the non-member institution and process the securities transaction backed by credit of the member if the value of the securities transaction is below the pre-established threshold, or alternatively;
   code to reject the securities transaction if the value of the securities transaction is above the pre-established threshold.

41. A method performed by a member securities exchange for processing a securities transaction on the member exchange where all securities
   transactions must be backed by credit of the member, the method comprising: transmitting a securities transaction from a non-member institution to a credit authorization service of the member exchange, wherein the transaction includes a mnemonic for an exchange member and an identity of the non-member institution and the credit authorization service acts as a surrogate for multiple exchange members;
   removing the identity of the non-member institution from the transaction; and
   exposing the transaction to the member exchange backed by credit of the member.

42. A method according to claim 41, further comprising receiving at the non-member institution, a message indicating that the transaction was executed.

* * * * *